United States Patent
Giles et al.

(10) Patent No.: US 7,057,525 B2
(45) Date of Patent: Jun. 6, 2006

(54) ONE WAY AUTOMATIC METER READING SYSTEM

(75) Inventors: Terence George Giles, Purley (GB); Kenny Steele, Croydon (GB)

(73) Assignee: Kenure Development Limited, Aldershot (GB)

( * ) Notice: Subject to any disclaimer, the term of this patent is extended or adjusted under 35 U.S.C. 154(b) by 421 days.

(21) Appl. No.: 10/220,580

(22) PCT Filed: Feb. 28, 2001

(86) PCT No.: PCT/GB01/00873

§ 371 (c)(1),
(2), (4) Date: Sep. 3, 2002

(87) PCT Pub. No.: WO01/67421

PCT Pub. Date: Sep. 13, 2001

(65) Prior Publication Data

US 2003/0020632 A1    Jan. 30, 2003

(30) Foreign Application Priority Data

Mar. 6, 2000  (GB)  .................................. 0005265

(51) Int. Cl.
*G08B 1/00* (2006.01)

(52) U.S. Cl. .................... 340/870.02; 455/517

(58) Field of Classification Search ........... 340/870.02, 340/10.41, 870.03, 870.18; 455/517
See application file for complete search history.

(56) References Cited

U.S. PATENT DOCUMENTS

| 5,438,329 A |   | 8/1995 | Gastouniotis et al. |
| 5,719,564 A | * | 2/1998 | Sears .................... 340/870.02 |
| 5,726,646 A |   | 3/1998 | Bane et al. |
| 5,808,558 A |   | 9/1998 | Meek et al. |
| 6,208,696 B1 | * | 3/2001 | Giles ........................... 375/272 |

* cited by examiner

*Primary Examiner*—Michael Horabik
*Assistant Examiner*—Hung Q. Dang
(74) *Attorney, Agent, or Firm*—Lowe, Hauptman & Berner, LLP

(57) ABSTRACT

A meter interface unit for use in a one way automatic meter reading system comprises first means for frequently transmitting a short burst transmission suitable for reception by a hand held or mobile receiver, and second means for transmitting narrow band data messages suitable for reception by a fixed network first tier receiving station. The receiver at the first tier receiving station has means for suppressing the short transmissions to prevent interference with the slow busts from the second transmitting means. Repeated packet collisions between the short bursts are avoided by randomly varying the time period between the short bursts.

15 Claims, 1 Drawing Sheet

DOUBLE CONVERSION SUPERHET WITH BLANKER

SINGLE CONVERSION SUPERHET WITH DSP

ONE WAY AUTOMATIC METER READING SYSTEM

CROSS REFERENCE TO RELATED APPLICATIONS

Applicants claim priority under 35 U.S.C. §119 of Great Britain Application No. GB 0005265.4, filed on Mar. 6, 2000. Applicants also claim priority under 35 U.S.C. §365 of PCT/GB01/00873, filed on Feb. 28, 2001. The international application under PCT article 21(2) was published in English.

BACKGROUND OF THE INVENTION

The present invention relates to automatic meter reading (AMR) and, more specifically, to a meter interface unit for use in a one way automatic meter reading system. In such a "one-way" system, as opposed to an "on-demand" system, the meter interface unit transmits only. Therefore the cost of the unit is kept to a minimum by reducing the necessary radio circuitry by the elimination of the receiver required by on-demand systems.

There are two types of automatic meter reading system architecture, "mobile" and "fixed" network systems. In the mobile type the meters are read by hand-held or mobile readers which travel through the vicinity of the meters to be read. In this case, a radio transmitter which has only a relatively short range is needed. In the second fixed network type of automatic meter reading system, a fixed network is provided to which each meter interface unit transmits. In this case, the transmitter in the meter interface unit requires a relatively long range if the number of receiving stations in the fixed network is to be kept the reasonable number.

1. Technical Problem

In many circumstances where a fixed network is to be installed there is a technical problem in finding suitable sites for the first tier of receiving stations.

2. Prior Art Solutions

This can be overcome by using hand-held or mobile readers for this first tier. GB-A-2330279 (WO 99/18700) describes a way of generating and receiving a short low-energy transmission that can be made very frequently, allowing the messages to be received with a minimum of delay. If the transmissions can be made sufficiently often and the radio range is adequate, a vehicle can travel at a normal road speed of, say, 40 km/h and still pick up all the readings.

Disadvantages of the Prior Art

Unfortunately because of the restriction on the battery power available and in order to minimise channel congestion these "blind" transmissions must be very short and at high data rates. This implies a wide radio band width and consequential low sensitivity for the reader's receiver hence giving a restricted range. If the same fast frequent transmissions are used in a fixed network system the range will be very limited, requiring a very high density of receiving points.

Installation of the meter interface units is one of the set up costs of installing an automatic meter reading system. Clearly it is not practical to replace the meter interface unit after installation if a local site for a first tier receiving station is found.

Example of One Way Fixed Network Requirements

In an average low power mobile AMR system a range of about 100 m can be achieved between the MIU and the reader. This corresponds to a scheme with a link budget of about 110 dB (10 dBm transmitter and a −100 dBm sensitivity receiver) and an operating frequency of 400–1000 MHz. If the reading vehicle is travelling at about 40 km/h the maximum time between the transmissions is limited to about 5 seconds. This ensures that the reader has the opportunity to receive at least two transmissions from each MIU. The duration of the data message will be in the range of 1–2 mS and if the message is about 120 bits long a data rate of about 100 kbps is needed. If the modulation used is Direct Frequency Shift Keying (DFSK) the receiver noise bandwidth must be approximately 400 kHz.

In a purely fixed network system the MIU is always within range of the reader and so the rate of transmissions is less important. A few times per day might be adequate with a typical rate of once every 4 hours. This means that the transmissions could last much longer with the same battery capacity and so the message could be sent at a slow data rate of say 200 bits/second. If the same data packet and modulation index is used the receiver noise bandwidth could be reduced to about 4 kHz. This could allow an improvement in the receiver sensitivity of about 20 dB. Elevating the receiver antenna and providing a modest amount of antenna gain could give a further 10 dB of link budget.

The total gain over the fast data rate mobile system is therefore 30 dB or 1000× power gain. In theory with free space propagation this would give a $\sqrt{1000}$ or 333 fold increase in the 100 m range. In practice with average urban conditions the improvement will be 7 to 20 times. This would mean that a 100 meter range wide band mobile system would achieve about 700 meters to a narrow band fixed receiver.

SOLUTION OF THE INVENTION

In accordance with the present invention there is provided a meter interface unit comprising means for connection to a utility meter which is to be read in a one way automatic meter reading system, wherein the interface unit is not provided with any means for receiving signals and comprises first means for frequently transmitting a short burst transmission suitable for reception by a hand held or mobile receiver, characterised in that the interface unit further comprises second means for transmitting narrow band data messages suitable for reception by a fixed network first tier receiving station.

In the following description the transmissions from the first transmitting means will be described as fast packets and the transmissions from the second transmitting means will be described as slow packets.

Such a solution has the advantage that when sites for first tier receiving stations are found these can be brought into use immediately without any change to the operation of the associated meter interface units. The fast packets are simply ignored and the slow packets decoded instead. This allows simple upgrade of a mobile system to a fixed network system or alternatively reading of meters from a vehicle reader if a fault develops with the fixed network. The presence of two transmitting means in the same meter interface unit creates its own technical problems but it has been found that these can be overcome in the embodiments described.

In accordance with the invention there are also provided receivers for use with such meter interface units that can eliminate the interference from the unwanted transmission.

BRIEF DESCRIPTION OF THE DRAWINGS

In order that the invention may be well understood some embodiments thereof will now be described, by way of example only, with reference to the accompanying diagrammatic drawings, in which.

DESCRIPTION OF PREFERRED EMBODIMENTS

Figure 1:
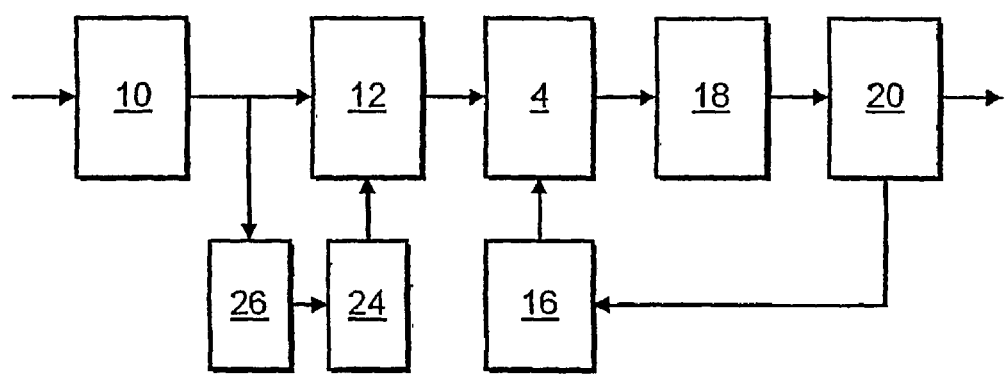
FIG. 1 shows a diagrammatic representation of a receiver in accordance with a first embodiment of the present invention for use in a slow mode fixed network first tier receiving station.

A meter interface unit (MIU) includes a first slow transmitter and a second fast transmitter. Both transmitters are capable of operating simultaneously in order to send both fast and slow data packets. The simplest solution would be to use a different radio channel for each type of transmission, but this would add considerable cost to the transmitter in the MIU. In the embodiment described, both transmitters use the same channel and there is a single modulator which generates both the fast and slow packets.

If the MIU modulator has sufficient bandwidth, the slow mode 200 bps data transmissions can be interleaved with fast mode 100 kbps data transmissions. For example the fast mode can be sent every 5 second and the slow mode every 8 hours. It may be necessary to reduce the rate of the fast transmissions to have sufficient battery power available for the slow transmissions.

A mobile reader designed to receive the fast packet transmissions is not going to be badly affected by the slow transmissions because typically they only occur for one second every 8 hours. Even in a situation where there are 50 MIUs in the range, the channel will be occupied with slow transmissions for less than 0 2%.

If we assume that the fast transmissions from all the MIUs in the range confirm to a random pattern with a Poisson type distribution, the traffic occupancy or through put of the channel R is given by:

$$R = \lambda \tau \quad (2.1)$$

Where: $\lambda$ is the mean arrival rate of the packets per second
$\tau$ is the packet duration in seconds The Poisson distributed probability of no transmissions occurring during any time period is given by:

$$Pr(0) = -e^{-R} \quad (2.2)$$

In a practical example if the 50 fast transmissions from the 50 MIUs occur every 5 seconds and the slow packet duration is 1 second from equation (2.1) R=10 and the probability of no interfering fast packets during a slow transmission is:

=1-Pr(0)
-1--e$^{-10}$
=1 approximately ie there is 100% probability of a slow mode packet being interfered with by a fast mode packet.

In practice FM capture effect will help to suppress any fast packets that are weaker than the desired slow mode transmissions but the system would still not work for weak signals.

Slow Mode Receiver

If the slow mode is sent at 200 bits/s each bit has duration of 5 mS which is considerably longer than the entire fast mode burst. This creates the effect of a small hole punched in each data bit by the fast transmissions. Typical existing slow receivers employs a narrow filter to get the desired noise bandwidth and the effect of this filter will be to lengthen the short fast transmission to several mS due to ringing.

This present application describes two methods that can be used to suppress the interference from the fast transmissions in a slow mode receiver at a fixed network first tier receiving station.

Noise Blanker Technique

The first method is similar to that employed in a high performance communication receivers to stop ignition interference type noises pulses from being lengthened by narrow filters and hence disrupting reception.

A block diagram of the receiver's first and second intermediate frequency sections (IFs) is shown in in FIG. 1. It is assumed that a conventional RF amplifier and mixer whose bandwidth is very wide precedes the first IF.

The first IF filter 10 has a several hundred kHz wide bandwidth so that it can pass the fast and slow data without any distortion or pulse lengthening. The signal from the filter 10 is then passed through a transmission gate 12, which is normally held closed. The signal is then converted to a low frequency and narrow band second IF by mixer 14 and local oscillator 16.

An output of the mixer 14 is fed to a narrow band IF filter 18 and then to a conventional amplifier and FM detector/data recovery circuit 20. When receiving a slow mode transmission an optional automatic frequency control (AFC) signal can be taken from the detector 20 and applied to the local oscillator 16, in such a way that the AFC will lock onto the incoming signal and remove any tuning errors. In a practical system it may be necessary to make the AFC voltage sweep so that it will lock on to the preamble of the slow transmission.

A monostable circuit 24 controls the transmission gate 12. A high-speed detector 26 is connected to the output of the first IF filter 10. The detector 26 is adapted to trigger the monostable circuit 24 if a fast mode burst is detected. This will cause the transmission gate 12 to open to prevent the fast burst from reaching the second mixer 14. In this way the energy from the fast burst is suppressed before it reaches the narrow filter 18 and so does not cause it to ring.

The period of the monostable 24 is adjusted to cause a minimum disruption to the wide data bits in the slow mode transmission. Typically, this could be 1–2 mS, which is only a fraction of the 5 mS slow data bit period.

If the fast mode transmission is too weak to trigger the detector 26 it will probably also not affect the slow data.

DSP Approach to Suppression of Fast Packets

Figure 2:
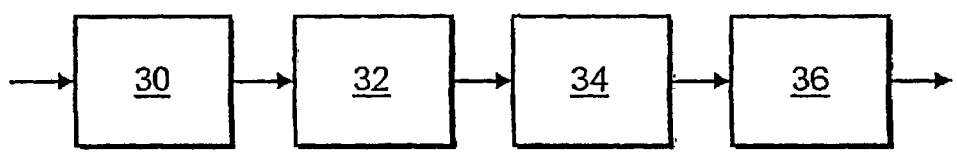
FIG. 2 shows a diagrammatic representation of an alternative embodiment of a slow mode receiver.

Digital Signal Processing (DSP) offers a simple solution to the receiver for the slow mode transmissions and this is shown in FIG. 2. This receiver also requires a mixer and local oscillator (not shown) to convert to the IF frequency. The received signal is then fed to a wide IF filter 30 typically at 10.7 MHz. The filtered signal from 30 is then amplified by an amplifier 32 and applied to an analogue to digital converter (ADC) 34. The digital signal is then processed by a DSP 36, and the recovered slow data passed to the rest of the system.

The DSP software can be used to implement a function similar to the hardware described in relation to the embodiment of FIG. 1. Alternatively, it is possible to synthesise narrow Finite Impulse Response (FIR) filters in the DSP that do not ring. In this way there would be no lengthening of the fast bursts and so they could be removed in the software without affecting the wanted data.

Improved Data Collision Technique

The system described above relies on all the transmissions from each of the MIUs being received in a random manner. In practice this is not always easy to achieve. One major hazard is that if on one cycle two fast packet transmissions collide it is likely that on the next cycle, say 5 seconds later they will collide again. It will then be necessary to wait until the slight differences between the clocks of the two MIUs allow them to drift sufficiently for the packets not to overlap.

Figure 3:
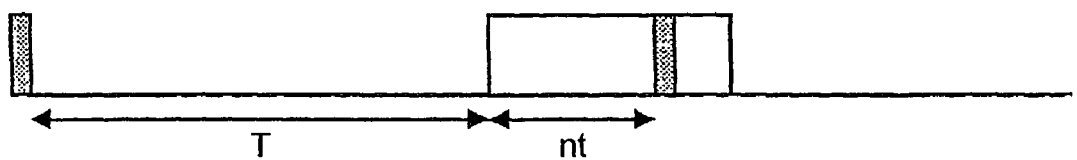
FIG. 3 a diagram illustrating the timing of fast packets in order to avoid data collision.

Previously this has been achieved by using low stability RC timed clocks to guarantee sufficient error. It is likely that in future the next generation of MIUs will have internal real time clocks. These will be designed to have the best possible stability and so if they are used to determine the transmission time two conflicting MIUs could stay in synchronisation for a consideration time making it nearly impossible to read either MIU. To overcome this problem it is proposed to take the regular and accurately timed clock period but add some randomisation of the timing to avoid consecutive collisions. In this way the first transmitter varies the time period between each successive short burst transmission. This solution is illustrated with reference to FIG. 3.

The basic timing period is defined at T e.g: 4 second and to this a period of t×n (where t is the duration of a packet and n is a random number) is added to define the timing of the next fast packet.

The random or pseudo random number n can be generated in a number of ways. For example:
1. By using a random number generator such as a pseudo noise (PN) sequence with the unit serial number as the seed. This could be implemented in either software or hardware.
2. Use a fast counter that is reset by a metering pulse so that n is a function of when the last metering pulse occurred.

It is preferable that the maximum randomising period nt is only a fraction of the main period T to prevent very large variations in the time between transmissions which might be a disadvantage in a mobile system. The use of the stable clock and true randomising also makes the calculation of battery life easier, as the average time between transmissions will be exactly T+nt/2.

The invention claimed is:

1. A meter interface unit comprising:
   means for connection to a utility meter which is to be read in a one way automatic meter reading system, wherein the interface unit is not provided with any means for receiving signals;
   a first means configured to frequently transmit a short burst (t) transmission suitable for reception by a hand held or mobile receiver; and
   a second means configured to transmit narrow band data messages suitable for reception by a fixed network first tier receiving station.

2. A meter interface unit as claimed in claim 1, wherein the first and second transmitting means operate on the same radio channel.

3. A meter interface unit as claimed in claim 1, wherein the first means is adapted to vary the time period between each successive short burst transmission.

4. A meter interface unit as claimed in claim 3, wherein the time period is T+n×t where T is a base time period t is the duration of a short burst transmission and n is a random number.

5. A receiver for use in a fixed network first tier receiving station for receiving signals transmitted by the second transmitting means of a meter interface unit as claimed in claim 1, comprising means configured to detect the presence of a short burst transmission and suppressing the transmission before the received signal passes through a narrow band filter.

6. A receiver as claimed in claim 5, wherein a high-speed detector is configured to control a monostable which opens a gate to prevent a short burst transmission reaching a second IF stage of the receiver.

7. A receiver as claimed in claim 5, wherein the suppression is implemented by digital signal processing means.

8. A meter interface unit comprising:
   a utility meter connection configured to connect to a one way automatic meter reading system;
   a first transmitter configured to frequently transmit a short burst (t) transmission suitable for reception by a hand held or mobile receiver; and
   a second transmitter configured to transmit narrow band data messages suitable for reception by a fixed network first tier receiving station.

9. A meter interface unit as claimed in claim 8, wherein the interface unit is not provided with any means for receiving signals.

10. A meter interface unit as claimed in claim 8, wherein the first and second transmitters operate on the same radio channel.

11. A meter interface unit as claimed in claim 8, wherein the first transmitter is adapted to vary the time period between each successive short burst transmission.

12. A meter interface unit as claimed in claim 11, wherein the time period is T+n×t where T is a base time period t is the duration of a short burst transmission and n is a random number.

13. A receiver for use in a fixed network first tier receiving station for receiving signals transmitted by the second transmitter of a meter interface unit as claimed in claim 8, comprising: a detector configured to detect the presence of a short burst transmission and suppress the detected transmission before the received signal passes through a narrow band filter.

14. A receiver as claimed in claim 13, wherein a high-speed detector is configured to control a monostable circuit which opens a gate to prevent a short burst transmission reaching a second IF stage of the receiver.

15. A receiver as claimed in claim 13, wherein the suppression is implemented by a digital signal processor.

* * * * *